Oct. 22, 1968 B. KAZAN 3,407,329
SCANNED CONVERSION TUBE
Filed Sept. 29, 1966
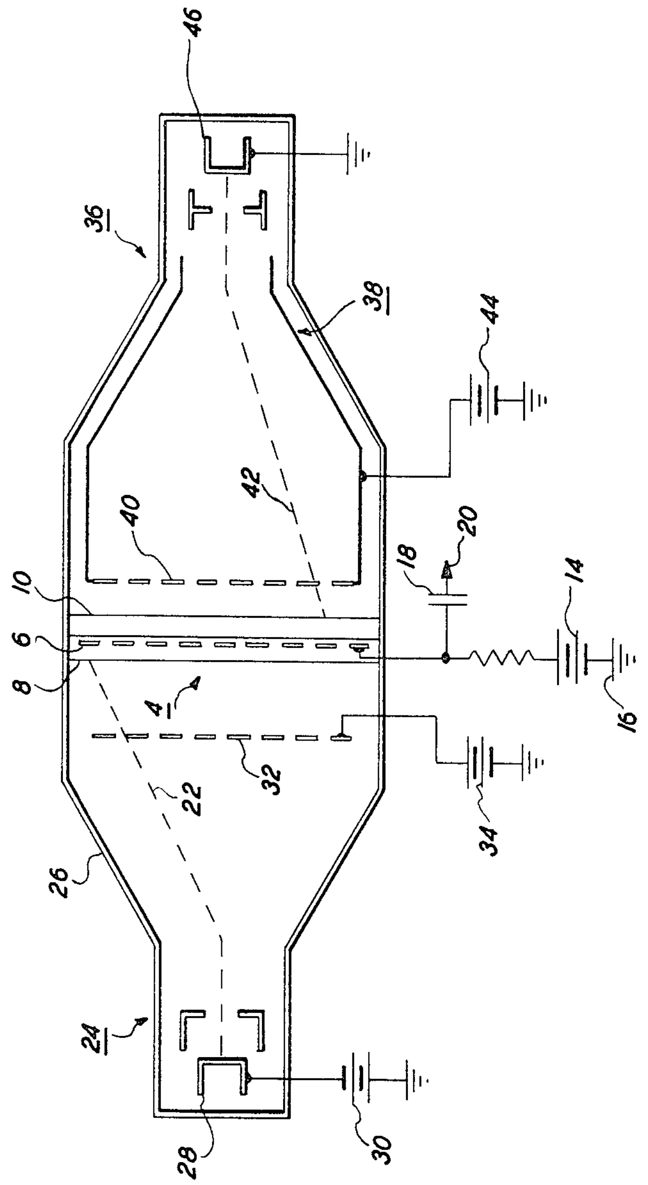
INVENTOR.
BENJAMIN KAZAN
BY Ronald Zibelli
ATTORNEY 3,407,329
Patented Oct. 22, 1968

3,407,329

SCANNED CONVERSION TUBE

Benjamin Kazan, Pasadena, Calif., assignor to Xerox Corporation, Rochester, N.Y., a corporation of New York Filed Sept. 29, 1966, Ser. No. 582,959
7 Claims. (Cl. 315—12)

In general, the present invention relates to storage tubes and more specifically to a field-effect scan conversion storage tube.

Considerable difficulty is experienced in the use of the prior art scan-conversion storage tubes. This difficulty arises from the fact that although such tubes can store input information, if a read out signal is required the storage time is greatly reduced, and in some devices the stored information is completely erased. For example, at the present time two general types of scan-conversion storage tubes exist. In these devices a scanning electron beam deposits a charge pattern on an insulating surface. The scanning electron beam is modulated by electrical input signals. In the two general types of tubes, the output is obtained either by scanning the target directly or by scanning a target mesh which has an insulating coating. In the first type of tube, the read out of the signal for a few scans completely erases the stored charges and thus the information. In the second type of tube, depending on the negative charges stored on the insulator a greater or lesser amount of the reading beam can pass through the holes to a collector electrode to provide an output signal. In this type of tube the charge on the target modulates the transmission of the reading beam through the target holes. A longer read out time is possible to the extent that the reading beam is prevented from landing on the negative target elements. However, as a result of positive ions generated by the collision of the reading beam with residual gas molecules, the target is gradually discharged, for example in a reading period of 5–10 minutes.

The prior attempts to correct for these deficiencies have resulted in bulky, complex structures which require carefully controlled operating conditions.

Many applications of a scan-conversion storage tube may be precluded or curtailed because of the above noted deficiencies.

Accordingly it is an object of this invention to provide a new, highly efficient scan-conversion storage tube which overcomes the deficiencies of the prior art devices as described above.

A further object of the present invention is to provide a new, highly efficient scan-conversion and storage method.

Another object of the present invention is to provide a device in which the charge pattern is neither discharged in order to produce a reading signal nor exposed to the reading beam or ions generated by the reading beam.

Further, it is an object of this invention to provide a device allowing increased storage and read out times.

Other objects and a fuller understanding of this invention may be had by referring to the following description and claims, taken in conjunction with the accompanying drawings.

The present invention overcomes the deficiencies of the prior art and achieves its objectives by utilizing a writing beam to produce a charge pattern on an insulator which by its field effect alters the point-to-point conductivity of a semiconductor layer and then by utilizing a reading beam to produce an output signal by detecting the conductivity variations in the semiconductor through a mesh which is sandwiched between the semiconductor and the insulator layers.

In order to facilitate understanding of the present invention, reference will now be made to the appended drawing of a preferred embodiment of the present invention. The drawing should not be construed as limiting the invention but is exemplary only. The figure is a cross-sectional diagrammatic representation of the present invention.

The general arrangement of a tube corresponding to the present invention is shown in cross section in the figure. The storage target 4 consists of a fine metallic mesh 6 coated on the writing beam side with a thin layer of insulator 8 and on opposite side with a layer of field-effect semiconductor 10. The term "mesh" as applied to element 6 is intended to include a wire array, or a conductive array formed by etching the insulator 8 in a desired pattern and silvering the etched areas, or any other foraminous conductive layer. Typical electrical insulators include glass, silicon monoxide, silicon dioxide, calcium fluoride, and aluminum oxide. Typical field effect semiconductors whose conductivity can be controlled by an applied field include cadmium sulfide, antimony trisulfide, zinc oxide, calcium oxide, and lead oxide.

The conductive mesh 6 of the storage target is connected by electrical conductors through a series load resistor 12 to a source of direct current bias 14 which provides a positive potential, for example on the order of 10 volts with respect to the ground 16 or cathode of the reading electrode gun. This potential may be varied in magnitude depending upon material selection, thickness, signal output required and other parameters. Connection of an output detection circuit including capacitor 18 between the mesh 6 and the load resistor 12 provides for an output signal 20 from the target through mesh 6 whenever a surge appears at the capacitor 18.

On the side of the storage target 4 having insulator layer 8 is the apparatus for producing the writing beam 22. This writing gun apparatus is indicated schematically at 24. The writing gun 24 is of a conventional design including envelope 26 and alignment, deflection, and focusing elements (not shown). The gun cathode 28 is biased negatively, for example, on the order of 1,000 volts by power supply 30. A collector mesh 32 is provided with a positive bias, on the order of, for example, 100 volts provided by power supply 34. The writing beam 22 is modulated by the input signal through the control elements of writing gun 24.

For read out of a charge pattern stored on the storage target 4 a reading gun is provided, indicated schematically at 36. The reading gun 36 producing reading beam 42 is of generally conventional design including alignment, deflection, and focusing elements (not shown). The wall coating 38 of the envelope and the collector mesh 40 are maintained positive, for example, at 250 volts with respect to ground or the cathode of the electron gun 46 by power supply 44.

In operation the insulator surface 8 of the storage target 4 is scanned by the writing beam 22. The writing beam 22 is modulated by the input signal through the control elements of writing gun 24. The writing beam 22 produces a charge pattern on the insulator 8 which is in this example positive with respect to the mesh 6. This charge pattern produces local fields which extend through the mesh 6 into the semiconductor 10. Due to the field effect, the conductivity of the semiconductor 10 varies from element to element across the storage target 4.

For read out, the semiconductor layer 10 is scanned by the constant-current reading beam 42 which, as in a vidicon type tube, arrives at the target 4 with a very low velocity, and thus tends to uniformly charge the semiconductor 10 to the potential of the reading-beam cathode 46. Between scans of the reading electron beam 42 the surface charge produced on the semiconductor layer 10 by the scanning beam 42 will leak off the surface at a rate dependent upon the local conductivity of the semiconductor layer 10, thus developing a charge pattern. As scanning of the semiconductor layer 10 is continued by the reading beam 42, the surface potential of the individual elements are sequentially shifted to the cathode potential of the reading gun 36. A capacitive output signal 20 is thus generated across the local resistor 12 series with the target mesh 6. For additional information on the read out of such electrical signals as are here involved, reference may be made to Kazan, B. and Knoll, M., "Charge-Controlled Storage Tubes," John Wiley and Sons, 1952.

It is to be noted that since scanning of the semiconductor 10 by the reading electron beam 42 has no influence on the stored input charges on the writing side of the insulator layer 8, the read out process may be continued for many hours or longer without disturbing the stored information.

Thus, in operation, the objects of the present invention have been achieved by utilizing a writing beam to produce a charge pattern on an insulator which by its field effect alters the point-to-point conductivity of a semiconductor layer and then by utilizing a reading beam to produce an output signal by detecting the conductivity variations in the semiconductor through a mesh which is sandwiched between the semiconductor and the insulator layers.

Although a specific preferred embodiment of the invention has been described in the detailed description above, the description is not intended to limit the invention to the particular forms or embodiments disclosed herein since they are to be recognized as illustrative rather than restrictive. It will be obvious to those skilled in the art that the invention is not limited to the illustrative embodiments but is susceptible to numerous modifications and applications. The invention is declared to cover all the changes, modifications and applications of the specific examples of the invention herein disclosed for purposes of illustration which do not constitute departures from the spirit and scope of the invention.

What is claimed is:

1. A scanned conversion tube comprising:

(a) an evacuated envelope;

(b) a storage target within said envelope comprising, (1) a fine conductive mesh, (2) an insulating layer coating one side of said mesh, (3) a field effect semiconductor coating the other side of said mesh;

(c) writing means responsive to an input signal to produce a charge pattern on said insulating layer whereby the point-to-point conductivity of said semiconductor layer will be altered;

(d) read out means to detect variations in said conductivity in said semiconductor layer.

2. The device of claim 1 wherein said writing means comprise a modulated scanning electron beam.

3. The device of claim 2 wherein said read out means comprise a scanning constant-current, low-velocity electron reading beam means to scan said field effect semiconductor of said storage target and output signal means to detect variations in the conductivity of said semiconductor layer through said mesh as said reading electron beam scans said semiconductor layer.

4. The device of claim 3 wherein said field effect semiconductor is zinc oxide.

5. The device of claim 3 wherein said field effect semiconductor is cadmium sulfide.

6. The device of claim 3 wherein said field effect semiconductor is antimony trisulfide.

7. A method of storing information for read out comprising:

(a) modulating a scanning writing electron beam with an input signal, (b) scanning an electrical insulator surface with said modulated electron beam to produce a storable charge pattern on said insulator surface whereby the point-to-point conductivity of an underlying field effect semiconductor is correspondingly altered in response to said stored charge pattern, (c) scanning said semiconductor with a reading electron beam when read out is desired, (d) detecting said conductivity variations in said semiconductor through a conductive mesh sandwiched between said semiconductor and said insulator as said semiconductor is scanned by said reading electron beam, and (e) reading out an output signal representative of said detected variations in conductivity in said semiconductor.

References Cited

UNITED STATES PATENTS 3,174,071 3/1965 Eberhardt ---------- 315—12

RODNEY D. BENNETT, *Primary Examiner.*

D. C. KAUFMAN, *Assistant Examiner.*